(12) United States Patent
Chiang

(10) Patent No.: US 6,747,928 B2
(45) Date of Patent: Jun. 8, 2004

(54) METHOD FOR COMPENSATING LASER ENERGY OF OPTICAL DISK DRIVE

(75) Inventor: Jen-Cheng Chiang, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 503 days.

(21) Appl. No.: 09/902,163

(22) Filed: Jul. 11, 2001

(65) Prior Publication Data

US 2003/0012102 A1 Jan. 16, 2003

(51) Int. Cl.⁷ .................................................. G11B 5/09
(52) U.S. Cl. .................................. 369/47.51; 369/53.26
(58) Field of Search .............................. 369/44.27, 47.5, 369/47.51, 47.52, 47.53, 53.26, 53.27, 53.37, 116

(56) References Cited

U.S. PATENT DOCUMENTS 5,268,893 A * 12/1993 Call et al. ................ 369/47.52
5,687,156 A * 11/1997 Hurst, Jr. ................. 369/47.53
5,703,841 A * 12/1997 Hiroki ....................... 369/116

* cited by examiner

Primary Examiner—Paul W. Huber
(74) Attorney, Agent, or Firm—Rosenberg, Klein & Lee

(57) ABSTRACT

The present invention discloses a method for compensating the laser energy of optical disk drives, which is used for adjusting and correcting the light source energy run-out for the laser light source of an optical disk drive, comprising the step of writing in the signal by several different laser illumination parameters when the optical disk drive is under the mode of data write; then using the bottom curve fit to take samples on a plurality of read signals; comparing the data at adjacent points to obtain the data of its relative slope; repeating the previous steps for several times to obtain a complete run-out factor and the maximum optimal laser illumination control parameter; and writing said maximum laser illumination value into the laser illumination control system of the optical disk drive such that the laser light source energy can be optimally compensated and controlled.

3 Claims, 6 Drawing Sheets

METHOD FOR COMPENSATING LASER ENERGY OF OPTICAL DISK DRIVE

BACKGROUND OF THE INVENTION

1. Field of the Invention

The present invention relates to a method for compensating laser energy of optical disk drive, more particularly a method used for the laser light source energy adjustment of an optical disk drive and the optimal light source energy compensation control.

2. Description of the Prior Art

As the Optical disk drive is widely used in audio and video equipments in our daily life and computers information equipment as well, serving as the major equipment for playing the audio and video data and reading data from the computer. However, the components of the mechanism of the optical disk drive used for reading or writing data are illuminated laser components such as the prior-art CDR/W. The intensity of the light source for the illuminating laser component determines the quality of reading and writing data; therefore the adjustment of the illuminating parameters of the laser components becomes extremely important.

The direct electric power relation value for the laser components' illumination of a traditional optical disk drive is measured in milliwatt (mw), which uses the unit of power to represent its output brightness or output parameter, and the whole laser component's illumination parameter is measured in milliwatt/ampere (MW/A) to represent its relative relation of output with respect to its input. Such value is generally considered as an electric voltage and under normal conditions, the laser light source energy (brightness) is always directly proportional to the value of the illumination parameter. In other words, when there is no run-out, the larger the value of illumination parameter, the larger is the emission of the laser light source energy.

In fact, the operation of the laser components in the optical disk drive is not as ideal as mentioned above. In FIG. 7, it shows the energy distribution of the laser light source of the optical disk drive. Since assembly relation of the laser component X and the lens Y of the optical disk drive is not completely free of interference. For example, the shifting of the lens Y in installation causes the disturbance problem of the shifted focus, or the disturbance factor due to the assembly between the servomotor of the optical disk drive and the optical disk, which will directly affect the intensity of the light source emitted from laser component X. Most of them are due to the shift factor of the lens Y. In FIG. 6, it shows the shift of light source energy caused by the reflection points A1, A2, and A3. We can see that the intensity of the light source at the reflection point A2 is stronger than those at A1 and A3. If using a function to present it, then the illumination parameter PW=F(P, Offset), which is a function containing the shift disturbance factor for the lens Y assembly.

FIG. 8 further discloses the curve that shows the relative energy loss caused by the shifting of the lens Y assembly by the laser light source, wherein it is obvious that no matter it is from the lens curve PHO, we can clearly see the illumination parameter curve RRF, light source feedback curve BHO, and the power input curve PLT. The energy loss at the reflection point A2 as shown in FIG. 6 is the smallest, and the energy losses at reflection points A1 and A3 are relatively the largest. In other words, the light source energy (brightness) at the reflection point A2 is the largest, but it does not mean that its input illumination parameter PW is the largest. FIGS. 9 to 12 respectively show the light source feedback curve BHO, power input curve PLT, illumination parameter curve RRF, and the waveform diagram of the input power FPDO for the laser component X and provide us with proofs. The light source energy intensity at reflection points A1, A2, and A3 will be affected by the disturbance factor of the shift lens Y assembly generating a disturbance change to the relation between the power parameter PW and the light source energy. It is unable to directly find the power parameter PW at an optimal light source energy point, which causes errors or insufficient light source energy when the optical disk is reading or writing data, and even causes failure in writing data or skipping tracks.

In addition, the prior art optical disk drive industry solves this problem by inspecting and adjusting the drive on the production line. Inspection and adjustment by labor force not only wastes time, labor force, and cost, but also cannot comply with the economic efficiency for the production. The adjustment to the light source energy totally depends on the personal experience of the professional staff, and the shift condition for the lens Y assembly of each optical disk drive is not the same, and it cannot let all of the products be accurately adjusted to the best illumination energy output conditions which causes uneven quality of the product, and seriously affects the stability and quality of the optical disk drive products.

SUMMARY OF THE INVENTION

The primary objective of the present invention is to provide a method for compensating the laser energy for optical disk drives, capable of accurately finding the maximum laser light source energy that eliminating the run-out for the lens assembly and its relative illumination parameter such that it puts the illumination energy into full play when the laser component writes in or read out data.

A further objective of the present invention is to provide a method for compensating the laser energy for optical disk drives, which can automatically find the optimal illumination parameter for the illumination energy under the run-out factor for any different lens assemblies.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
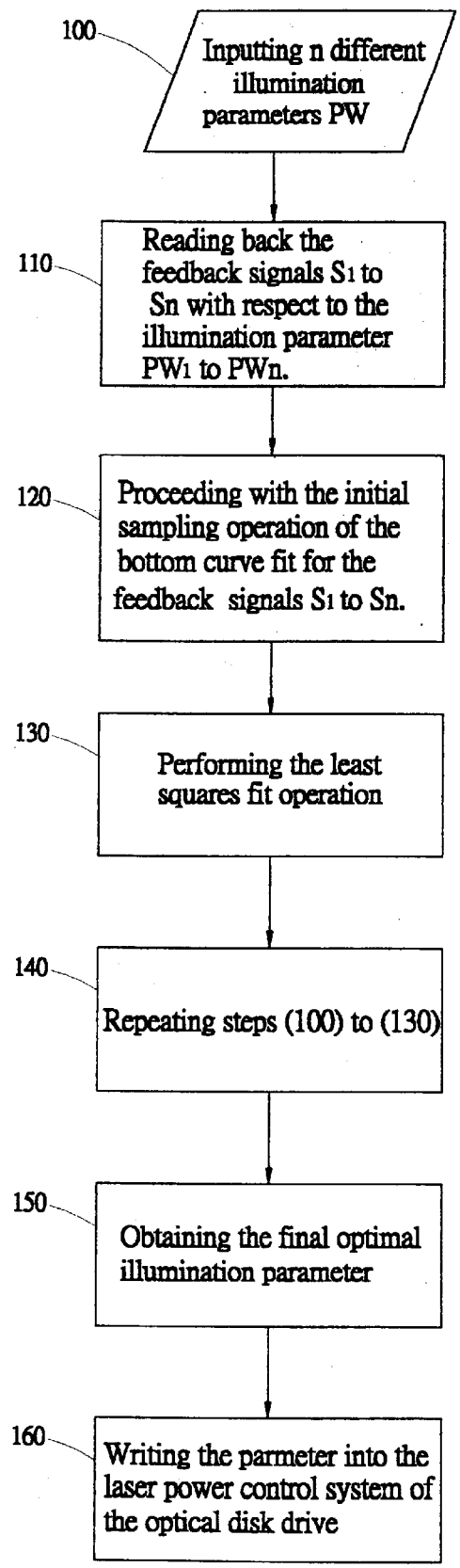
FIG. 1 is a flowchart of the method according to the present invention.
Figure 2:
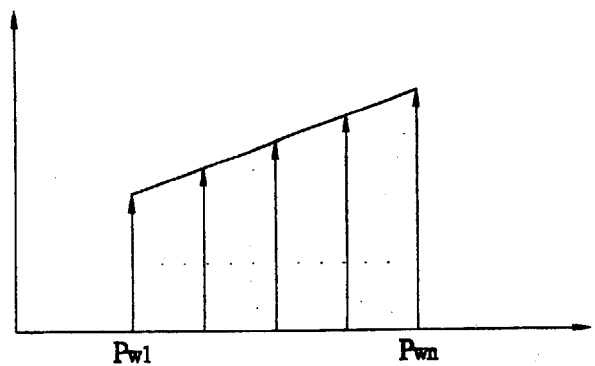
FIG. 2 is a relation diagram of a multiple write in laser light source energy and the illumination parameter according to the present invention.
Figure 3:
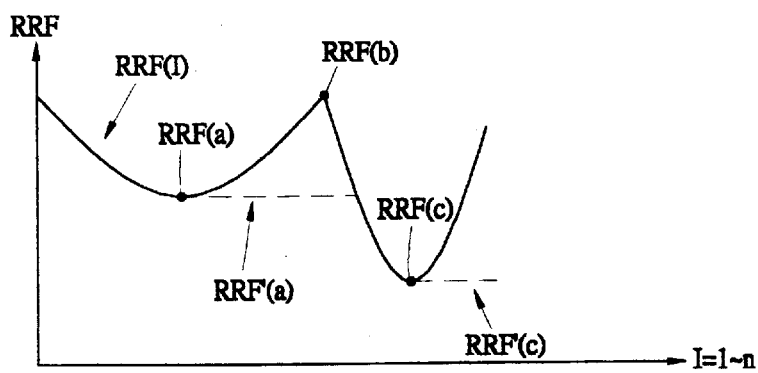
FIG. 3 is an initial sampling diagram of the present invention when it proceeds with the bottom curve fit.

Please refer to FIG. 1 for the flowchart of the method according to the present invention, comprising the following steps of:

(100) Inputting n different illumination parameters PW, that is using n different illumination parameters ($PW_1$ to $PW_n$) as shown in FIG. 2 to input into the laser component so that it writes data on the optical disk under the data write in mode of the optical disk drive;

(110) Reading back the feedback signals $S_1$ to $S_n$ (as shown in FIG. 3) with respect to the illumination parameter $PW_1$ to $PW_n$ under the read mode of the optical disk drive to read back the transmitted light source signal;

(120) Proceeding with the initial sampling operation of the bottom curve fit for the feedback signals $S_1$ to $S_n$, that is taking samples for the bottom curve fit for the curve constituted by the feedback signals $S_1$ to $S_n$;

(130) Performing the least squares fit operation, which minimizes the value of the result from the above steps to obtain a new illumination parameter;

(140) Repeating Steps (100) to (130);

(150) Obtaining the final optimal illumination parameter; and (160) Writing the parameter into the laser power control system of the optical disk drive.

Please refer to FIG. 3. The following will describe in details for the computation in each of the following steps of the method as shown in FIG. 1. Further description accompanying with the figures is given below, wherein FIG. 3 shows the curve diagram of the illumination parameter $PW_1$ to $PW_n$ shown in FIG. 1 with respect to the feedback signals $S_1$ to $S_n$ performing an initial sampling computation of a bottom curve fit. Firstly, the curve is defined as an illumination function RRF(I), I=1 to n, and the sampling rules are:

<1> If RRF(I)≦RRF(I+1), and the slope between two points is positive (ascending), then RRF'(I+1)=RRF(I), which will force the next point to have the value of the original point;

<2> If RRF(I)>RRF(I+1), and the slope between two points is negative (descending), then RRF'(I+1)=RRF(I+1), which will keep the value of next point unchanged, but remains it original value.

As shown in the example in FIG. 3, there are three function points: RRF(a), RRF(b), and RRF(c).

1<a, b, c<n, that is the three values of a, b, and c is between 1 and n, wherein the slope before the function point RRF(a) is negative (descending) and each function point remains its original value, and the slope between the function points from RRF (a) to RRF (b) is positive (ascending), the value of each function point is forced to maintain the value at RRF(a) to form a new function RRF'(a). The slope between the function points RRF(b) to the function point RRF(c) is negative (descending), and the value of each function point in this range remains unchanged. The slope for the function points after the RRF(c) is positive (ascending) and the value is forced to keep the value of RRF(c) to form a new function RFF'(c).

Please refer to FIG. 4 again. After the computation of the bottom curve fit as shown in FIG. 3, a new curve is obtained and a new illumination function is defined as RRF'(I), I=1 to n, and a computation operation is performed to minimize such illumination function RFF'(I), and there is no limitation on the exponential value. The example taken for this invention is a $5^{th}$ exponential calculation, and the formula is listed below:

The RRF'(I) is expanded into a $5^{th}$ exponential formula:

$$RRF'I = A0 + A1i^{-1} + A2i^{-2} + A3i^{-3} + A4i^{-4} + Vi \tag{A}$$

Where, the error function V(I) is the fit error, and is represented by a matrix as shown in Formula B:

$$\begin{bmatrix} RRF'_1 \\ RRF'_2 \\ RRF'_3 \\ \vdots \\ RRF'_n \end{bmatrix} = \begin{bmatrix} 1 & 1 & 1 & 1 & 1 \\ 1 & 1/2 & 1/4 & 1/8 & 1/16 \\ 1 & 1/3 & 1/9 & 1/27 & 1/81 \\ \vdots & \vdots & \vdots & \vdots & \vdots \\ 1 & 1/n^1 & 1/n^2 & 1/n^3 & 1/n^4 \end{bmatrix} \begin{bmatrix} A0 \\ A1 \\ A2 \\ A3 \\ A4 \end{bmatrix} + \begin{bmatrix} V1 \\ \vdots \\ Vn \end{bmatrix} \tag{B}$$

And then simplify the matrix to obtain the following Formula (C).

$$RRF' = HA + V \tag{C}$$

Then the error matrix V of the above-mentioned Formula (C) is minimized to obtain the Formula (D).

$$Q(\text{Cost Function}) = \tfrac{1}{2} V^T V = \tfrac{1}{2}(RRF' - HA)^T (RRF' - HA) \tag{D}$$

Perform the differential equation on the above formula with respect to A gives a minimum value of zero for the error matrix V, and then substituted back into Formula (C) and simplify the expression as in Formula (F).

$$\frac{\sigma \theta}{\sigma A} 1/2 (RRF' - HA)^T (RRF' - HA) = (RRF' - HA)^T(-H) = 0 \tag{E}$$

$$H^T RRF' = H^T HA \tag{F}$$

And then obtain the final formula (G):

$$A' = [1 + H^T]^{-1} H^T RRF' \tag{G}$$

Formula (G) shows the matrix coefficient A' of the illumination function RRF' obtained from the bottom curve fit, and the final relation formula is derived as Formula (H):

$$RRF''(I) = HA' \tag{H}$$

Figure 4:
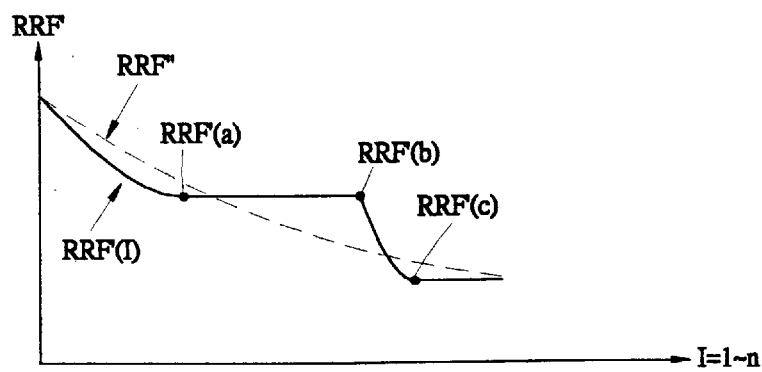
FIG. 4 is a curve diagram of the present invention when it performs the minimum block fit process.

The steps of operation as shown in FIGS. 2 to 4 are repeated, that is the steps 100 to 130 as shown in FIG. 1 give a new illumination parameter RRF'' obtained from the secondary bottom curve fit computation, and the value is calculated by the secondary bottom curve fit and it totally eliminates the run-out factor caused by the deviation of the lens assembly of the optical disk drive. The value is an optional illumination parameter so that it has the maximum light source energy output for the laser component of the optical disk drive.

Figure 5:
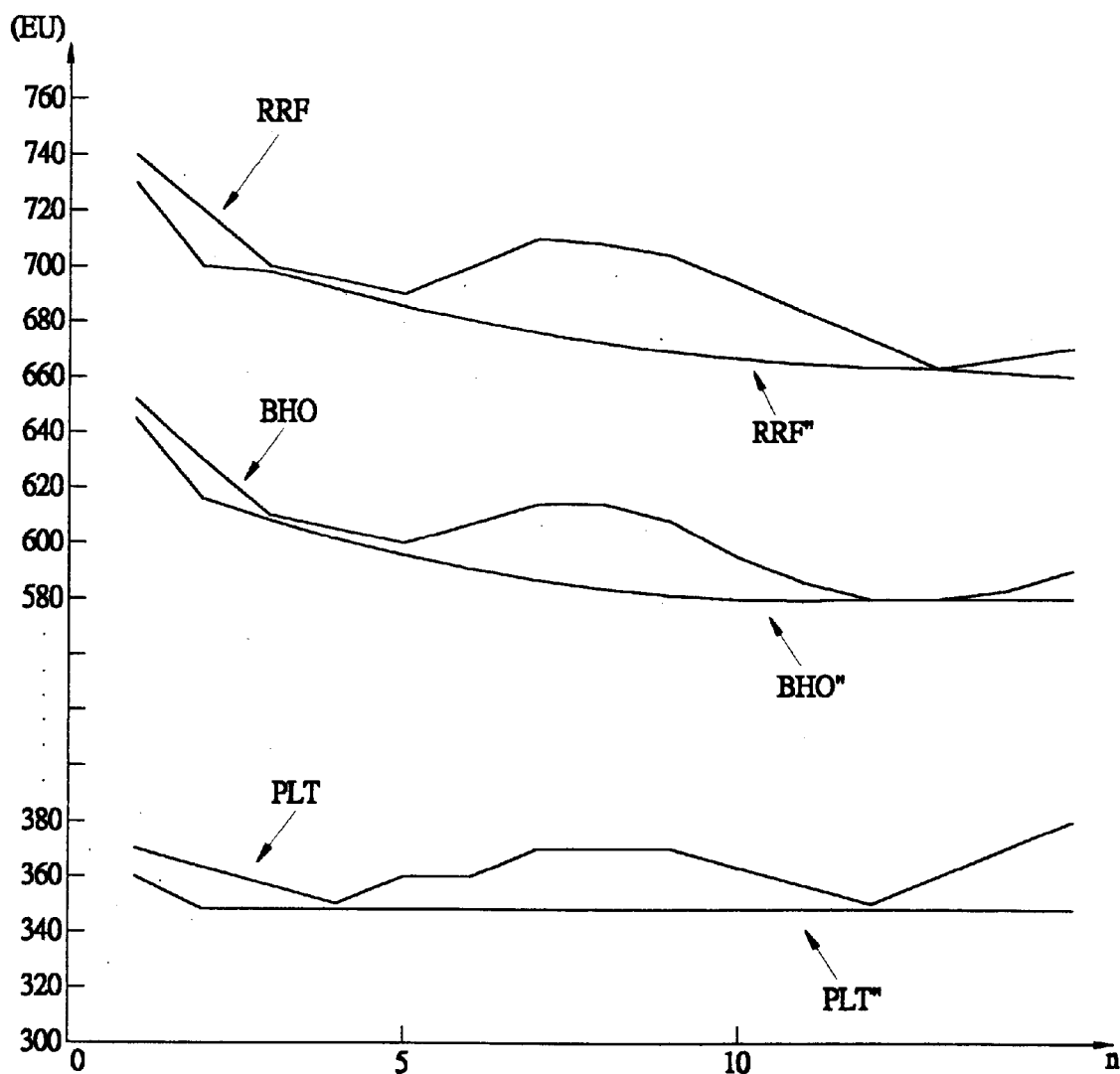
FIG. 5 is a curve diagram of the final process result of the bottom curve fit according to the present invention.

Please refer to FIG. 5 again. Similarly, after the computation according to the method of the present invention on the light source feedback curve BHO and power input curve PLT, the light source feedback value BHO" and the power input parameter PLT" of the run-out factor caused by the deviation of the lens assembly of the optical disk drive are obtained. Such computation method, formula, and matrix can be used in the program of a computer instead, and can be written into the related control components in the power control system of the laser illumination of the optical disk drive. Its application will be described in more details in later sections. The computer program or software is not claimed by the present invention and hence is not described here.

Figure 6:
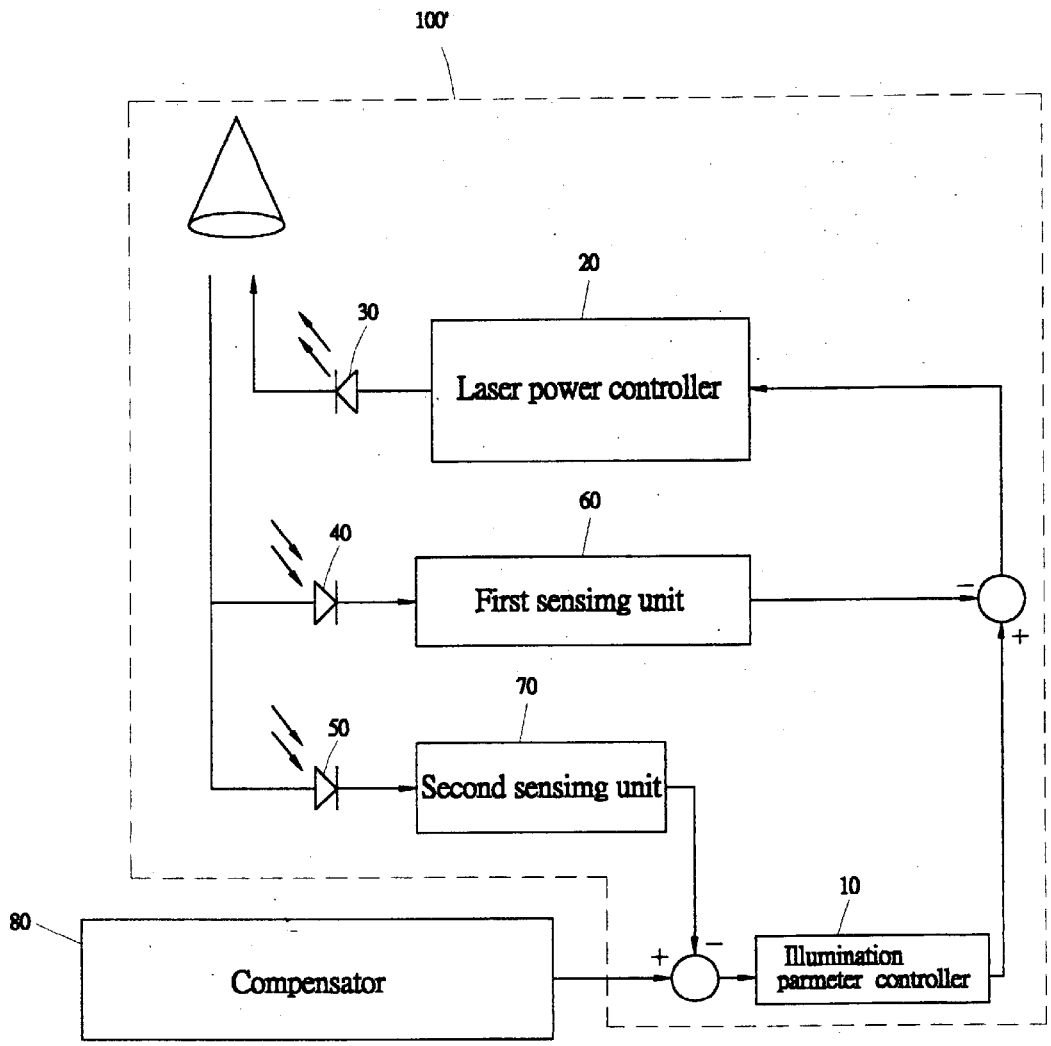
FIG. 6 is a method according to the preferred embodiment of the present invention.
Figure 7:
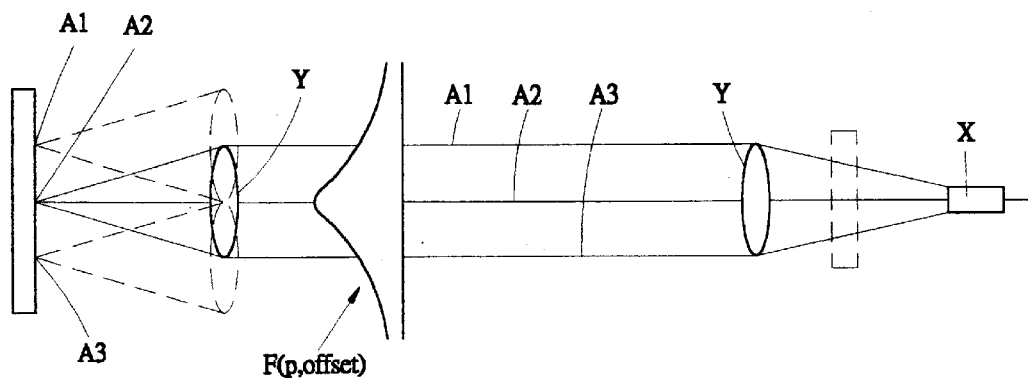
FIG. 7 shows the relation of the laser light source energy and illumination parameter of a prior-art laser component and the lens of an optical disk drive.
Figure 8:
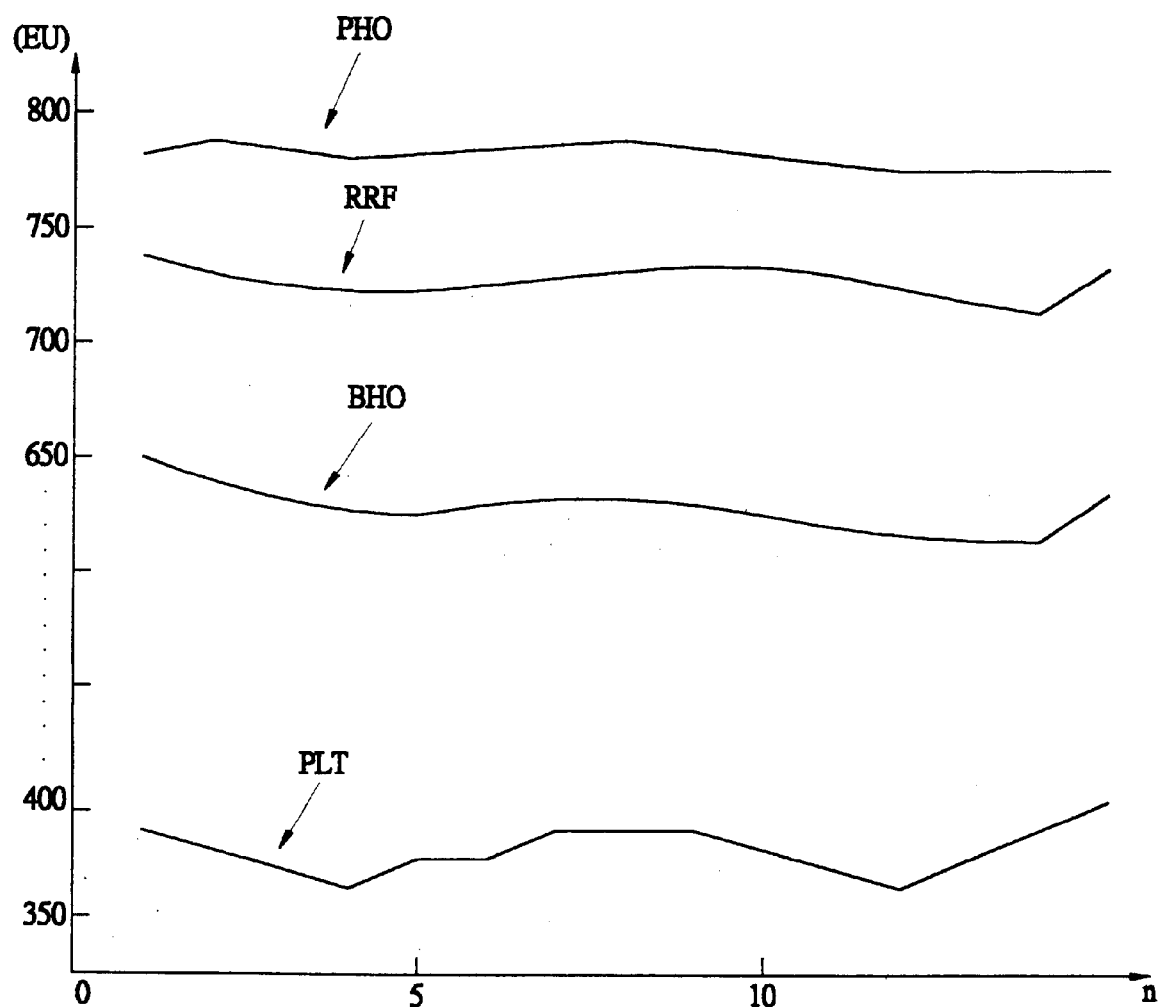
FIG. 8 is a curve diagram of each light source energy parameter due to the shift of lens assembly of a prior-art laser component of an optical disk drive.
Figure 9:
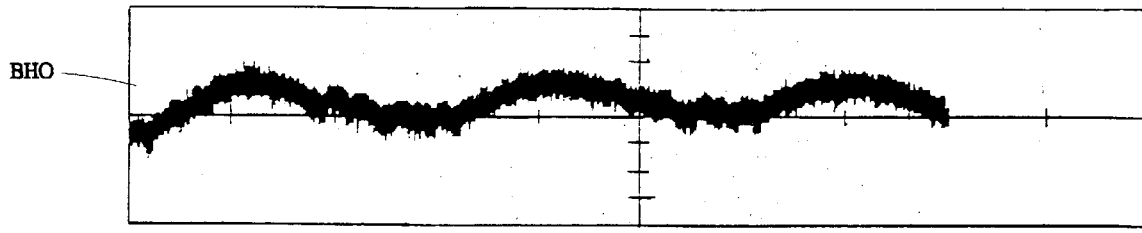
FIG. 9 is a waveform diagram of the light source feedback curve BHO of the laser component of the prior-art optical disk drive.
Figure 10:
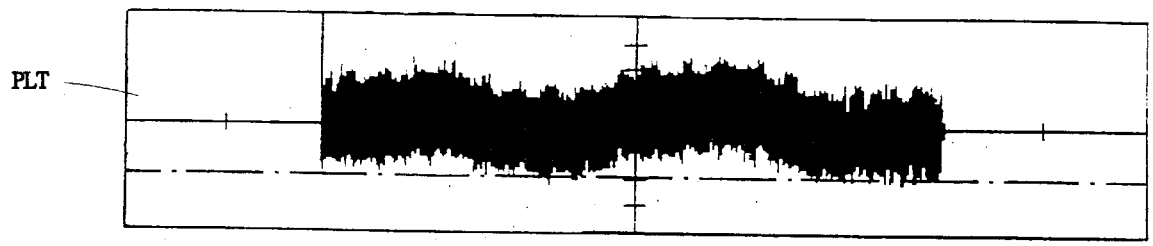
FIG. 10 is a waveform diagram of the write in curve PLT of the laser component of the prior-art optical disk drive.
Figure 11:
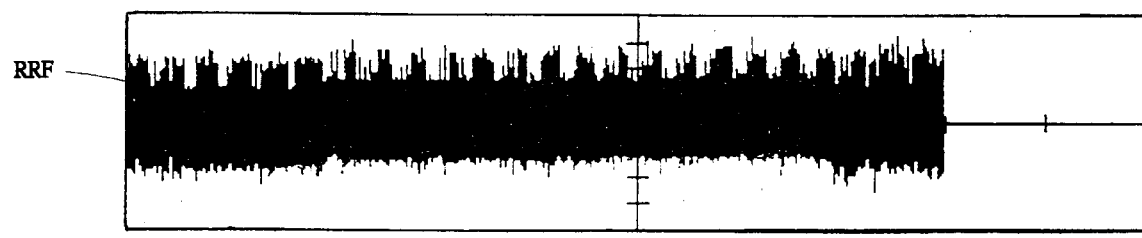
FIG. 11 is a waveform diagram of the illumination parameter curve RRF of the laser component of the prior-art optical disk drive.
Figure 12:
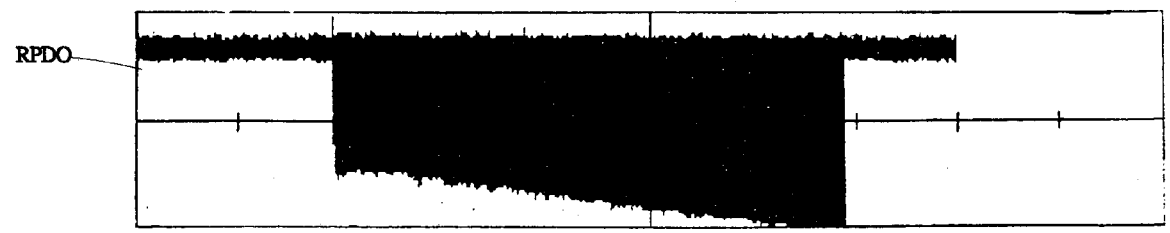
FIG. 12 is a waveform diagram of the input power FPDO of the laser component of the prior-art optical disk drive.

Please refer to FIG. 6 for the method of the present invention. In actual practice of the power control system 100' of the laser illumination of the optical disk drive, the power control system 100' comprises a reference optical process controller (R.O.P.C.) 10, a laser power controller 20, a laser component 30, a pick-up component 40, a parameter feedback component 50, a first sensing unit 60, a second sensing unit 70 wherein the laser component 30 is made of laser diodes controlled by the laser power controller 20 to generate the light source energy (illumination); the pick-up component 40 and the parameter feedback component 50 are also composed of the light emitted diode used to detect the signal emitted from the light beam reflection by the laser component 30, and separately sent to the first sensing unit 60 and the second sensing unit 70 to process the detected signals. The illumination controller 10 performs a negative feedback operation by the input illumination parameter and the signal feed backed from the first sensing unit 60, and the computed result is sent to the above laser power controller 20 as a basis for the illumination control for the laser component 30.

Through the operation formula, matrix, and calculation according to the method of the present invention as shown in FIGS. 2 to 5, it can be accomplished by a computer program or software to write the data into a compensator 80, and the feedback signal output from the output end and the second sensing unit 70 is sent to the illumination parameter controller 10 after the feedback signal calculation. The calculation result from the compensator 80 gives the parameter information such as the optimal illumination parameter RRF", the light source feedback value BHO", and the power input parameter PLT" of the run-out factor caused by the deviation of the lens assembly of the optical disk drive and provides them to the entire power control system 100' as a basis for the optimal control for the output light source energy of the laser component 30. The result is saved in the memory of the power control system 100' (not shown in the figure) such that the optical disk drive can automatically obtain the optimal output light source energy compensation and output control for the laser component 30 regardless of the run-out factor caused by the deviation of the lens assembly of the optical disk drive. Such arrangement can reduce the labor force and cost for the adjustment and testing of the optical disk drive in great extent.

FIG. 6 shows a preferred embodiment of the present invention, which is not limited to the power control system 100' as it discloses. Any read/write optical disk drive having a power control system for the laser component that uses this method and compensation control mode to save labor force for the adjustment or testing is intended to be included in the scope of this invention, and the present invention is indeed commercially useful for the industry.

Therefore, in summation of the above description, the present invention obviously attains the objective of the present invention. The inventor of the present invention based on years of experience in the related industry conducted extensive research to enhance the structure of the present invention herein which is hereby submitted for patent application.

While the invention has been described in what is considered the most practical and preferred embodiments, it is understood that the invention is not limited to the disclosed embodiments, but is intended to cover various modifications and similar arrangements and procedures within the spirit and scope of the broadest interpretation and equivalent arrangements, modifications, and procedures.

What is claimed is:

1. A method for compensating laser energy of an optical disk drive, comprising the steps:
   (a) inputting a plurality of different illumination parameters for a laser component such that the laser component writes data onto an optical disk with the plurality of different illumination parameters under the write in mode of the optical disk drive;
   (b) reading the illumination parameter of the feedback signal with respect to the step (a), and reading back the transmitted light source signal under the reading mode of the optical disk drive;
   (c) performing a preliminary sampling of a bottom curve fit for the feedback signal, and taking sample for the curve constituted by the feedback signal according to the step (b) to proceed with the curve fit computation;
   (d) minimizing the least square fit for the minimum value obtained from the step (c) to get a new illumination parameter;
   (e) repeating the steps (a) to (d);
   (f) obtaining the final optimal illumination parameter;
   (g) writing the optimal illumination parameter of the step (f) into the laser power control system of the optical disk drive; wherein the optimal illumination parameter obtained from each step eliminating run-out factors due to the deviation of a lens assembly of the optical disk drive, characterized in that the output light source energy of the laser component of the optical disk drive is the largest.

2. A method for compensating laser energy of an optical disk drive as claimed in claim 1, wherein said feedback signal of step (b) is detected and feed backed by a parameter feedback component.

3. A method for compensating laser energy of an optical disk drive as claimed in claim 2, wherein said parameter feedback component used to detect the feedback signal is a light emitting diode.

* * * * *